(12) United States Patent
Hisata et al.

(10) Patent No.: US 8,794,162 B2
(45) Date of Patent: Aug. 5, 2014

(54) FOLDABLE AIRCRAFT PASSENGER LAP TABLE

(71) Applicant: B/E Aerospace, Inc., Wellington, FL (US)

(72) Inventors: Suzuko Hisata, Atlanta, GA (US); Alexander Nicholas Pozzi, Winston-Salem, NC (US); Glenn Allen Johnson, Rural Hall, NC (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 13/803,565

(22) Filed: Mar. 14, 2013

(65) Prior Publication Data

US 2013/0247797 A1 Sep. 26, 2013

Related U.S. Application Data

(60) Provisional application No. 61/614,100, filed on Mar. 22, 2012.

(51) Int. Cl.
*A47B 23/00* (2006.01)

(52) U.S. Cl.
USPC ............................................. 108/43; 108/165

(58) Field of Classification Search
USPC ................................ 108/43, 44, 45, 162, 165
See application file for complete search history.

(56) References Cited

U.S. PATENT DOCUMENTS

| 3,791,314 | A | * | 2/1974 | Berretta | 108/43 |
| D271,917 | S | * | 12/1983 | Magis | D3/274 |
| 5,106,156 | A | * | 4/1992 | Marquis | 108/43 |
| 5,611,098 | A | * | 3/1997 | Skibik | 108/43 |
| 5,765,795 | A | * | 6/1998 | Alex | 248/346.01 |
| 7,121,214 | B1 | * | 10/2006 | Toltzman et al. | 108/43 |
| D577,223 | S | * | 9/2008 | Durmon, Jr. | D6/406.6 |
| 8,167,131 | B1 | * | 5/2012 | Anderson | 206/575 |
| 8,327,774 | B1 | * | 12/2012 | Rivera | 108/44 |
| 8,519,946 | B2 | * | 8/2013 | Schneider | 345/156 |
| 2003/0230220 | A1 | * | 12/2003 | Evans et al. | 108/43 |
| 2008/0282940 | A1 | * | 11/2008 | Marion | 108/43 |
| 2010/0236452 | A1 | * | 9/2010 | Ruddy | 108/43 |

* cited by examiner

*Primary Examiner* — Jose V Chen
(74) *Attorney, Agent, or Firm* — Shumaker, Loop & Kendrick, LLP

(57) ABSTRACT

A foldable lap table including a first table leaf joined along a first hinge to a second table leaf, the first hinge folding in a first direction, and a third table leaf joined along a second hinge to a fourth table leaf, the second hinge being a linear extension of the first hinge and folding in a second direction opposite the first, wherein the third table leaf is further joined to the first table leaf along a third hinge and the fourth table leaf is further joined to the second table leaf along a fourth hinge such that the respective hinges and leaves are arranged to permit unison movement of the leaves when the lap table is folded and unfolded.

15 Claims, 3 Drawing Sheets

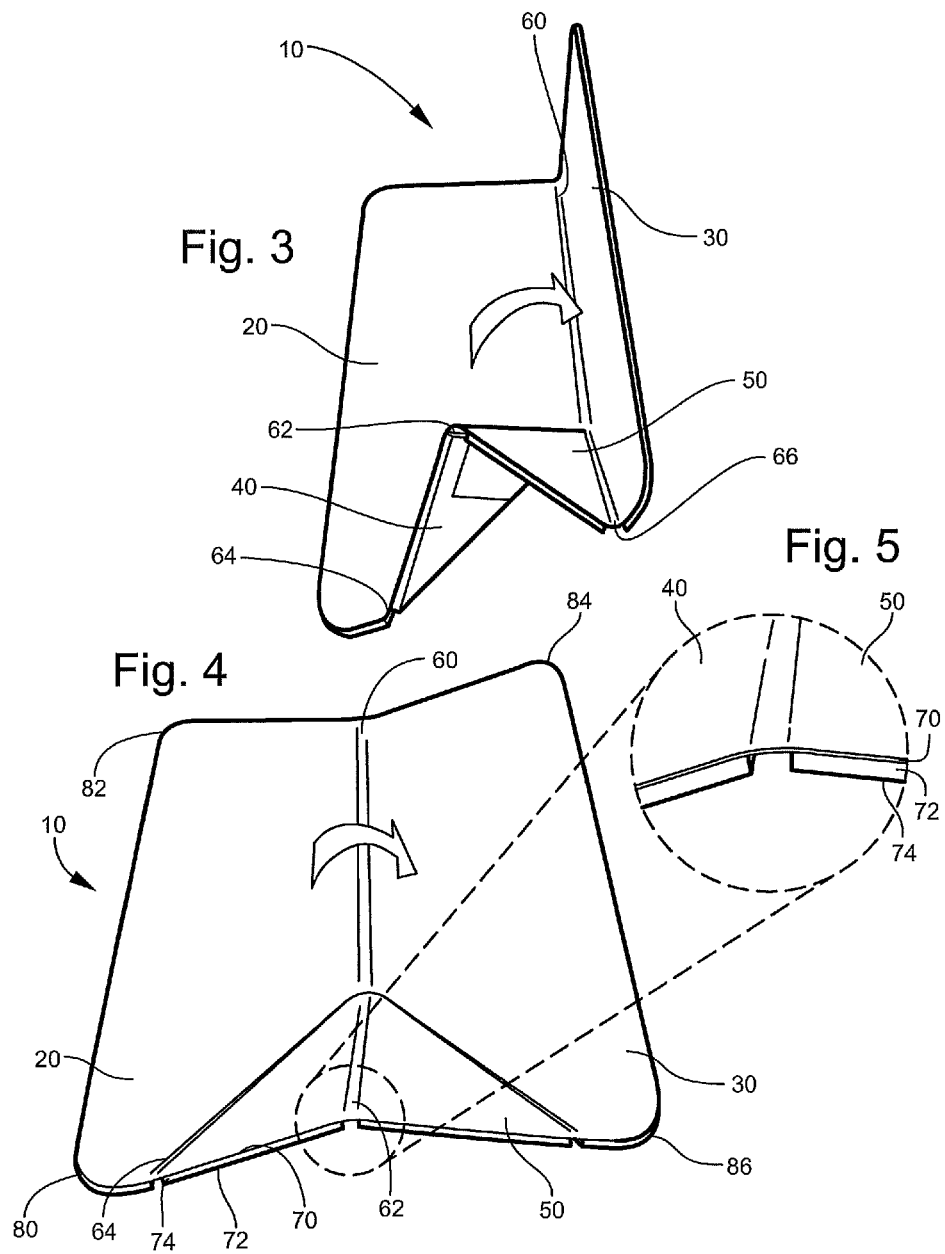

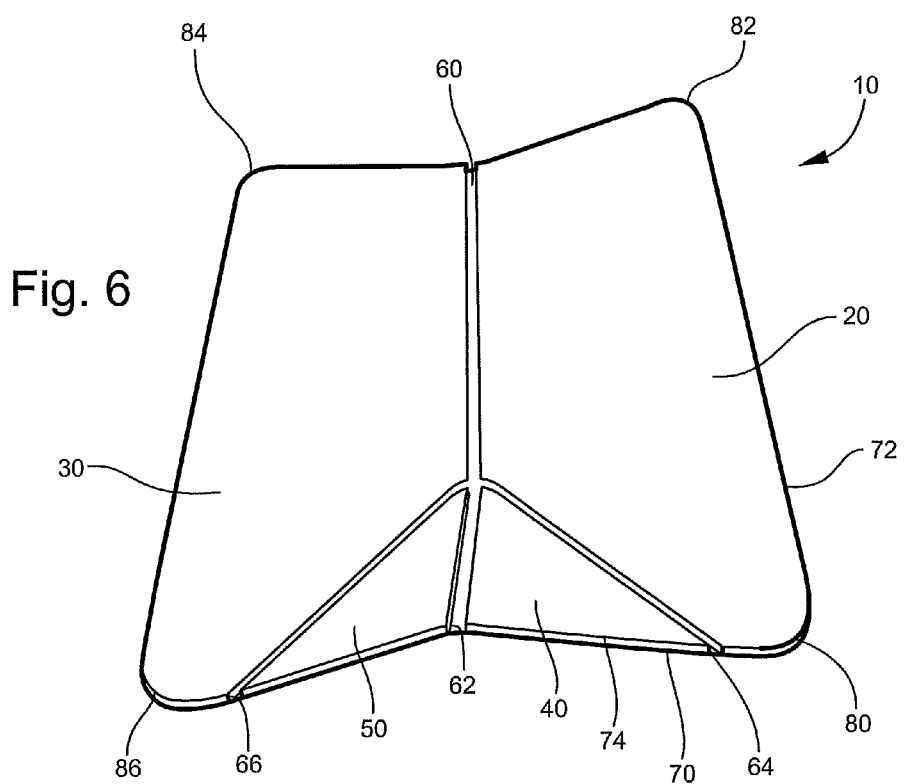

FOLDABLE AIRCRAFT PASSENGER LAP TABLE

CROSS-REFERENCE TO RELATED APPLICATION

This application claims priority to U.S. Application No. 61/614,100 filed Mar. 22, 2012, which is incorporated by reference herein.

TECHNICAL FIELD AND BACKGROUND OF THE INVENTION

The present invention relates generally to the field of aircraft passenger seat accessories and, more particularly, to foldable lap table with a large tabletop that can be readily deployed and stowed away as needed with a simple opening and closing motion.

Aircraft passenger seats and suites typically include a variety of accessories for passenger use and convenience. Some of these accessories are fixed in position and are ready for use, some are permanently attached to other surfaces and move between deployed and stowed positions, and others are free from attachment and must be stowed in compartments when not being used. It is with respect to this third type of accessory that this particular invention finds application.

Aircraft passengers typically require some form of tabletop surface for working and dining. While coach class aircraft passenger seats typically include a tray table deployable from a stowed position attached to the back of a forward positioned seat or attached to the side of the seat, tray tables associated with suite style seats are often inconvenient to position in certain seating configurations or are not comfortable for use in all seating positions. For example, a deployable tray table permanently mounted within an aircraft passenger suite may not achieve a convenient or comfortable use position for a passenger in a lie flat seating position, such as with a bed. Whereas a tray table might work when the suite is configured as a seating arrangement, it may not work when the suite is configured as a bed. Similarly, an attached table for use in an aircraft bed configuration would not work when the suite is reconfigured as a seating arrangement. Additionally, as some aircraft passenger suites may include both a work/dining chair and a passenger seat, an attached tray table may not be conducive to both work dining chair use and passenger seat use.

Further, it is typical for tabletops and tray tables located in aircraft passenger cabins to serve many functions. Aircraft passengers may use tray tables for food and beverages, reading and writing, seating electronic devices, playing cards and games, etc. Any and all such tasks are carried out in an environment with extreme space and weight constraints, and where bumps, jostles and turbulence are commonplace.

Accordingly, there is a need for a table that is not required to be tied and affixed to an aircraft passenger seat, seat back, arm, cabin, fuselage or any other fixture of the aircraft. There is also a need for an aircraft passenger table that is easily and efficiently stowed and that is lightweight. Further, there is a need for a tabletop suitable for a variety of different tasks and that functions well in the turbulent nature of aircraft travel.

SUMMARY OF THE INVENTION

It is therefore an object of the present invention to provide an aircraft passenger auxiliary table surface that is free from attachment for use in any seating, resting or reclining position or in any other position within the aircraft.

It is a further object of the invention to provide an aircraft passenger table that can be readily and easily deployed and stowed as needed.

It is a further object of the invention to provide an aircraft passenger table having a thin profile and of lightweight construction so as not to require extra stowage space or weight in a tight aircraft interior.

It is a further object of the invention to provide an aircraft passenger table that facilitates writing and drafting, dining, laptop computer use, and other uses common on passenger aircraft.

These and other objects and advantages of the invention are achieved by providing a foldable aircraft passenger table designed to facilitate large tabletop space that can be readily deployed and stowed away as needed with a simple opening and closing motion. One side of the foldable aircraft passenger table has a surface that resists skidding of implements placed on the table, such as dining articles when a passenger is dining. Such a surface may prevent articles from sliding during aircraft turbulence. The other, opposite, side of the foldable aircraft passenger table has a surface that is smooth, rigid and depression resistant to facilitate writing, drafting and other such activities. The table is divided into a plurality of sections or table leaves.

According to one embodiment of the invention, a foldable lap table is provided that operates in a folded and an unfolded configuration. The lap table has a first table leaf joined along a first hinge to a second table leaf. The first hinge folds in a first direction. The lap table also has a third table leaf joined along a second hinge to a fourth table leaf. This second hinge is a linear extension of the first hinge. The second hinge folds in a second direction opposite in direction from the first direction when the lap table is in the unfolded position. The third table leaf and the fourth table leaf collectively define a triangular shape. The third table leaf is also joined to the first table leaf along a third hinge and the fourth table leaf is also joined to the second table leaf along a fourth hinge. The respective hinges and leaves are configured to permit unison movement such that the third and fourth table leaves are hidden between the first and second table leaves in the folded position and are exposed in the unfolded position.

According to another embodiment of the invention, the first, second, third and fourth hinges may be each living hinges.

According to another embodiment of the invention, the first, second, third and fourth table leaves may each include a plurality of layers. One of the plurality of layers may be a top layer that is contiguous among each of the leaves and includes the first, second, third and fourth living hinges.

According to another embodiment of the invention, the second table leaf may be a mirror image of the first table leaf and the fourth table leaf may be a mirror image of the third table leaf.

According to another embodiment of the invention, the plurality of layers may include an intermediate layer adhered to the top layer and a bottom layer adhered to the intermediate layer. The intermediate layer or the bottom layer of any one of the first, second, third or fourth table leaves may not be attached to the intermediate layer or the bottom layer of another leaf.

According to another embodiment of the invention, the top layer may be made from a flexible material that is bend-fatigue resistant and skid resistant. The bottom layer may be made from a smooth material that is depression resistant or has a self-leveling material. The bottom layer may be rigid to support a laptop or tablet and optionally may conduct heat. In a specific example, the top layer may be made of rubber or felt and the bottom layer may be made of rigid plastic or lightweight metal.

According to another embodiment of the invention, the first and second table leaves and the third and fourth table leaves together form a generally planar tabletop when the foldable lap table is in the unfolded position. In such an embodiment, the first or second table leaves form a reversible smaller table top having a surface area less than half of the generally planar table top of the unfolded position when the foldable lap table is in the folded position.

According to another embodiment of the invention, the foldable lap table in the folded position may fit within and is stowable within a typical commercial airline seat pocket.

According to another embodiment of the invention, the foldable lap table in the unfolded position may include four rounded corners. The foldable lap table in the folded position may include three rounded corners.

According to another embodiment of the invention, the foldable lap table in the unfolded position may include four rounded exposed corners having an arc of approximately 90 degrees and the table in the folded position may include three rounded exposed corners having an arc of approximately 90 degrees.

According to another embodiment of the invention, the lap table includes a plurality of leaves connected together by a plurality of living hinges. Each one of the leaves includes a top layer made of a flexible, fatigue and skid resistant material for supporting objects during aircraft turbulence and a bottom layer made of a smooth depression resistant material for writing. In this embodiment, the top layer forms the living hinges and the bottom layer of each one of the plurality of leaves is either independent from the bottom layer of the other leaves or does not affect the operation of the living hinge of the top layer. An exposed surface area of the foldable lap table in the folded position is less than one half the size of the exposed surface area of the foldable lap table in the unfolded position.

According to another embodiment of the invention, at least two discrete leaves of the plurality of leaves are mirror images of two other discrete leaves of the plurality of leaves, and the foldable lap table is sized to fit in the lap of a typical passenger in either the folded or unfolded position and also sized to be stowable within a typical commercial airline seat pocket.

BRIEF DESCRIPTION OF THE DRAWING FIGURES

The present invention is best understood when the following detailed description of the invention is read with reference to the accompanying drawings, in which:

FIG. 3 is a top perspective view of the foldable aircraft passenger table shown in a partially unfolded position;

FIG. 4 is a top perspective view of the foldable aircraft passenger table shown in a substantially unfolded position;

FIG. 5 is a close up perspective view of the layers and a living hinge of the foldable aircraft passenger table; and FIG. 6 is a rear perspective view of the foldable aircraft passenger table shown in a substantially unfolded position.

DETAILED DESCRIPTION OF THE PREFERRED EMBODIMENT

Figure 1:
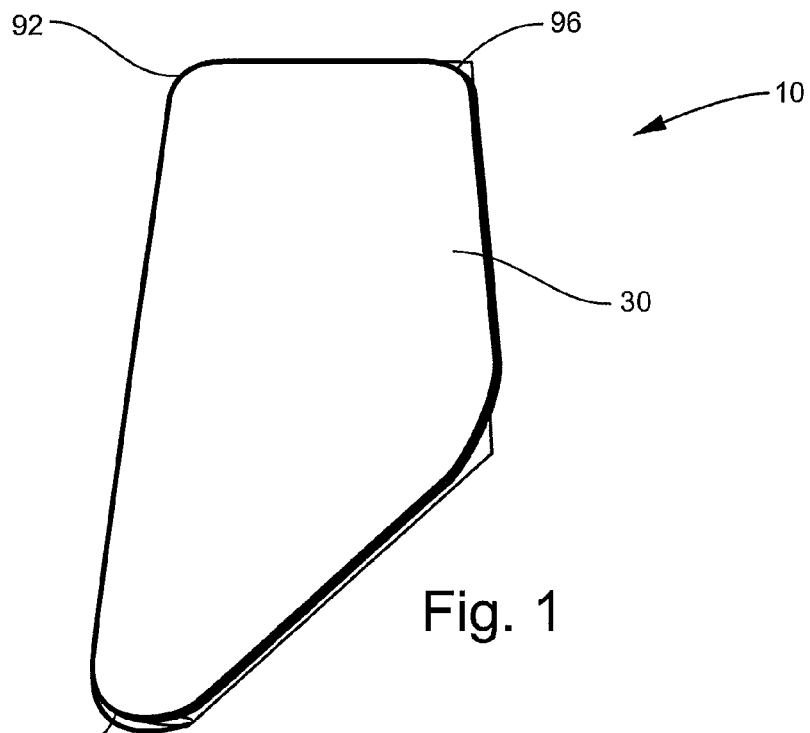
FIG. 1 is a top perspective view of the foldable aircraft passenger table in the folded position.
Figure 2:
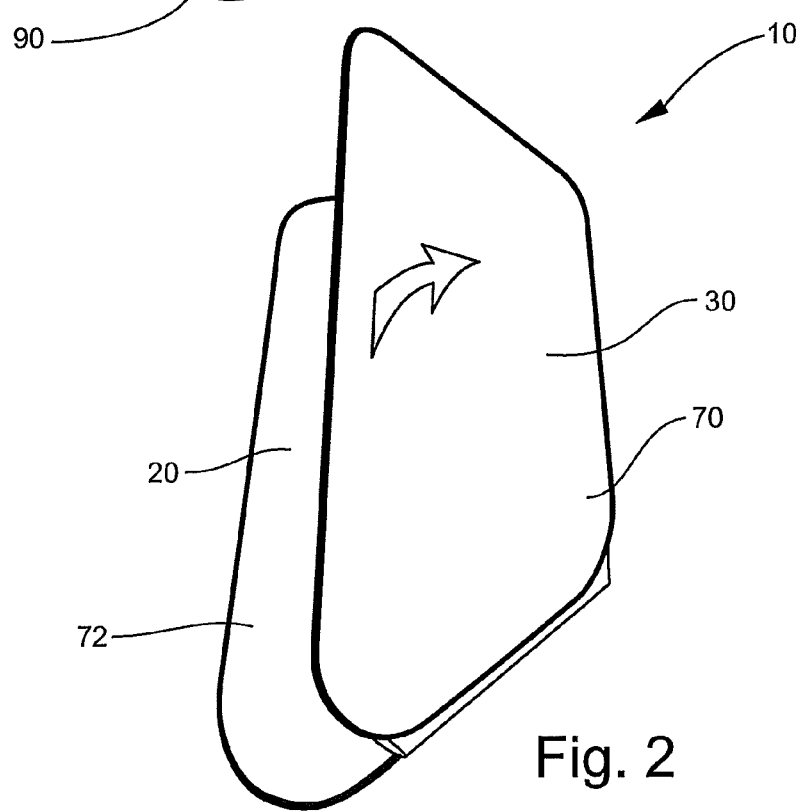
FIG. 2 is a top perspective view of the foldable aircraft passenger table shown in a partially unfolded position.

Referring now specifically to the drawings, a foldable aircraft passenger lap table is shown generally at reference numeral 10. The foldable lap table operates from a folded position as shown in FIG. 1 to partially unfolded positions as shown in FIGS. 2 and 3 to a substantially unfolded position as shown in FIGS. 4 and 6. The foldable aircraft passenger table 10 may be easily unfolded for use and folded for stowage when not in use.

Referring to FIG. 4, the foldable lap table 10 includes a first leaf 20, a second leaf 30, a third leaf 40 and a fourth leaf 50. The third leaf 40 and the fourth leaf 50 are generally triangular in shape. The foldable lap table 10 also includes a first living hinge 60, a second living hinge 62, a third living hinge 64 and a fourth living hinge 66. The first living hinge 60 is located between the first table leaf 20 and the second table leaf 30. The first living hinge 60 forms the link between the first table leaf 20 and the second table leaf 30. The second living hinge 62 is located between the third table leaf 40 and the fourth table leaf 50. The second living hinge 62 forms the link between the third table leaf 40 and the fourth table leaf 50. The second living hinge 62 is a linear extension of the first living hinge 60 when the foldable lap table 10 is in the unfolded position as shown in FIGS. 4 and 5. When the foldable lap table 10 is in the folded position as in FIG. 1, the second living hinge 62 rotates in a direction opposite from the first living hinge 60.

The third living hinge 64 of the foldable lap table 10 is located between the first table leaf 20 and the third table leaf 40. The third living hinge 64 forms the link between the first table leaf 20 and the third table leaf 40. The third living hinge 64 is located at an acute angle to the second living hinge 62 when the foldable lap table 10 is in the unfolded position.

The fourth living hinge 66 of the foldable lap table 10 is located between the second table leaf 30 and the fourth table leaf 50. The fourth living hinge 66 forms the link between the second table leaf 30 and the fourth table leaf 50. The fourth living hinge 66 is located at an acute angle to the second living hinge 62 when the foldable lap table 10 is in the unfolded position.

When the foldable lap table 10 is in the unfolded position as shown in FIGS. 4 and 6, the second table leaf 30 is a mirror image of the first table leaf 20. Likewise, the fourth table leaf 50 is a mirror image of the third table leaf 40. In the unfolded position, the foldable lap table 10 has four rounded corners 80, 82, 84 and 86, each one of the corners having an arc of approximately 90 degrees.

Each of the first table leaf 20, the second table leaf 30, the third table leaf 40 and the fourth table leaf 50 is made of a plurality of layers as best shown in FIG. 5. The top surface layer 70 is contiguous among all of the leaves 20, 30, 40 and 50 and forms the material of each of the first living hinge 60, second living hinge 62, third living hinge 64, and fourth living hinge 66. Preferably, the top surface layer 70 is made of a material that is bend-fatigue resistant and is also skid resistant such as rubber or thermoplastic polymer. The top layer may also be felt. The top surface layer 70 is concealed when the foldable lap table is in the folded position as in FIG. 1 and is exposed for use when the foldable lap table 10 is in the unfolded position as in FIG. 4. The bottom surface layer 72, unlike the top surface layer 70, may not be continuous among the first table leaf 20, the second table leaf 30, the third table leaf 40 and the fourth table leaf 50. That is, the bottom surface layer 72 of the first table leaf 20 may not touch and may be separate from the bottom surface layer 72 of the other leaves. The bottom surface layer 72 of the second table leaf 20 may not touch and may be separate from the bottom surface layer 72 of the other leaves. The bottom surface layer 72 of the third table leaf 40 may not touch and may be separate from the bottom surface layer 72 of the other leaves. The bottom surface layer 72 of the fourth table leaf 50 may not touch and may be separate from the bottom surface layer 72 of the other leaves. Thus, the bottom surface layer 72 may not form any portion of any of the respective living hinges 60, 62, 64, or 66. The bottom surface layer 72 is exposed in the fold position as shown in FIG. 1 and is also exposed in the unfolded position as shown in FIG. 6. The bottom surface layer 72 may be smooth, depression resistant, and rigid to permit and support writing thereon. The bottom surface layer 72 may also be made of a material that conducts heat away from objects placed thereon. The bottom surface 72 may be made of a rigid plastic, of a metal, or of another material. One or both of the top and bottom surfaces may be made from self-leveling or "self-healing" material. In an alternative embodiment, the bottom surface layer 72 is contiguous among the leaves and does not interfere with the hinge functionality of the top surface layer 70.

In some embodiments, an intermediate layer 74, as shown in FIG. 5, is located between the top surface layer 70 and the bottom surface layer 72. In such an embodiment, the top surface layer 70 is adhered or otherwise attached to the intermediate layer 74 and the bottom surface layer 72 is also adhered or otherwise attached, on an opposite from the top surface layer 70, to the intermediate layer 74. In embodiments without an intermediate layer 74, the top surface layer 70 is adhered or otherwise attached to the bottom surface layer 72. The intermediate layer 74 may be made of the same material as the top surface layer 70, of the same material as the bottom surface layer 72, or of another material.

When the foldable lap table 10 is in the folded position as shown in FIG. 1, the rigid surface of the bottom surface layer 72 is exposed on both sides of the foldable lap table 10 so that the passenger may use either side to bear down on and to write upon. In the folded position as shown in FIG. 1, the foldable lap table 10 has three rounded corners, 90, 92 and 96, each having an arc of approximately 90 degrees. In the folded position, the portion of the exposed surface area useful at any one time is less than one half of the portion of the exposed surface area useful at any one time when in the unfolded position. Thus, if a passenger wishes to write and to bear down on the bottom surface 72, he may do so in either the folded position of FIG. 1 or the unfolded position of FIG. 6. That is, if the passenger's writing area requirements are small, he may use bottom surface 72 of the foldable lap table 10 in the folded position shown in FIG. 1. Conversely, if the passenger requires mores space upon which to bear down and write, he may use the bottom surface 72 of the foldable lap table 10 in the unfolded position as shown in FIG. 6. On the other hand, if the passenger desires to dine or to place articles on the foldable lap table 10 and reduce the chance that the articles would slide or move as a result of turbulence, the passenger may use the top surface 70 of the foldable lap table 10 in the unfolded position as shown in FIG. 4.

The foldable lap table 10 is thus designed to facilitate large tabletop space that can be easily deployed and stowed away as needed with a simple opening and closing motion. The thin profile of the foldable lap table 10 does not require extra stowage space in tight aircraft interiors. Referring to FIGS. 2 and 3, the foldable lap table 10 affords easy opening and closing action via the living hinges 60, 62, 64 and 66. In this hinged manner, the third and fourth table leaves 40, 50 are able to simultaneously fold inward as the first and second table leaves 20, 30 are brought together when the foldable lap table 10 is being folded for stowage.

Opening and closing of the foldable lap table 10 is accomplished with one hand with a simple lifting motion to separate the faces of the top surface layer 70 of the first table leaf 20 and second table leaf 30 that make up the majority of the surface area of the foldable lap table 10 in the unfolded position. Closing the foldable lap table 10 can be accomplished using one hand to bring the top faces of top surface layers 70 of the first table leaf 20 and second table leaf 30 together.

Referring to FIG. 3, the foldable aircraft passenger table 10 is shown about halfway open, revealing the third and fourth table leaves 40, 50 that had been concealed by the first and second table leaves 20, 30 when the foldable lap table 10 was fully folded as in FIG. 1. The third and fourth table leaves 40, 50 overlap one another when the foldable lap table 10 is in the folded position. The third and fourth table leaves 40, 50 make up a lesser portion of the total surface area of the foldable lap table 10 when in the unfolded position of FIGS. 4 and 6. When the foldable lap table 10 is in the folded position, the third and fourth table leaves 40, 50 fold against the respective first and second table leaves 20, 30 such that they are trapped between the first and second table leaves 20, 30 and the foldable lap table 10 surface area is smaller than its unfolded size.

A foldable aircraft passenger lap table according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A foldable lap table, folding from an unfolded to a folded position comprising:
    a first table leaf joined along a first hinge to a second table leaf, the first hinge folding in a first direction, from the unfolded position;
    a third table leaf joined along a second hinge to a fourth table leaf, the second hinge being a linear extension of the first hinge, in the unfolded position, and the second hinge folding in a second direction opposite the first direction, from the unfolded position;
    the third table leaf further joined to the first table leaf along a third hinge, the third hinge forming a first acute angle with the second hinge in the unfolded position and a first obtuse angle with the first hinge in the unfolded position;
    the fourth table leaf further joined to the second table leaf along a fourth hinge, the fourth hinge forming a second acute angle with the second hinge in the unfolded position and a second obtuse angle with the first hinge in the unfolded position; and
    wherein, the respective hinges and leaves are arranged to permit unison movement of the leaves when the lap table is folded and unfolded such that as the lap table is folded by movement of any one leaf, the first leaf and the second leaf rotate towards one another about the first hinge, the third leaf and the first leaf rotate towards one another about the third hinge, the fourth leaf and the second leaf rotate towards one another about the fourth hinge, and the third leaf and the fourth leaf rotate towards one another about the second hinge.

2. The foldable lap table of claim 1, wherein the first, second, third and fourth hinges are living hinges formed by a top layer contiguous among the first, second, third and fourth table leaves.

3. The foldable lap table of claim 2 wherein the first, second, third and fourth table leaves each include one or more layers.

4. The foldable lap table of claim 3, wherein the second table leaf is a mirror image of the first table leaf about the first hinge and the fourth table leaf is a minor image of the third table leaf about the second hinge.

5. The foldable lap table of claim 3, wherein the top layer is made from a flexible material that is bend-fatigue resistant and skid resistant.

6. The foldable lap table of claim 3, wherein the top layer is made of rubber.

7. The foldable lap table of claim 3, wherein the one or more layers include an intermediate layer adhered to the top layer and a bottom layer adhered to the intermediate layer.

8. The foldable lap table of claim 7, wherein the bottom layer is made from a smooth, depression resistant material.

9. The foldable lap table of claim 7, wherein the bottom layer is rigid.

10. The foldable lap table of claim 1, wherein:
the first, second, third and fourth table leaves collectively form a planar tabletop when the foldable lap table is fully unfolded, and
the first and second table leaves collectively form a reversible tabletop having a surface area less than a surface area of the tabletop collectively formed by the first, second, third and fourth table leaves when the foldable lap table is partially unfolded.

11. The foldable lap table of claim 1, wherein the foldable lap table in a folded configuration fits within a seat pocket.

12. A foldable lap table, folding from an unfolded and folded position, comprising:
a first table leaf joined along a first living hinge to a second table leaf, wherein the second table leaf is a mirror image of the first table leaf about the first hinge and the first living hinge rotates in a first direction, from the unfolded position;
a third table leaf joined to a fourth table leaf along a second living hinge that is a linear extension of the first living hinge, in the unfolded position, wherein the third table leaf is a mirror image of the fourth table leaf about the second living hinge and the second living hinge rotates in a second direction opposite the first direction, from the unfolded position;
the third table leaf further joined to the first table leaf along a third living hinge, the third living hinge forming a first acute angle with the second living hinge in the unfolded position and a first obtuse angle with the first living hinge in the unfolded position;
the fourth table leaf further joined to the second table leaf along a fourth living hinge, the fourth living hinge forming a second acute angle with the second living hinge in the unfolded position and a second obtuse angle with the first living hinge in the unfolded position; and
wherein the first, second, third and fourth living hinges are formed by a top layer contiguous among the first, second, third and fourth table leaves.

13. The foldable lap table of claim 12, further comprising an intermediate layer adhered to the top layer and a bottom layer adhered to the intermediate layer, the bottom layer being rigid.

14. The foldable lap table of claim 12, wherein the first, second, third and fourth hinges are arranged such that folding the first hinge simultaneously folds the second, third and fourth hinges and unfolding the first hinge simultaneously unfolds the second, third and fourth hinges.

15. The foldable lap table of claim 12, wherein the lap table in a fully unfolded configuration defines a planar tabletop having a surface area collectively made up of the first, second, third and fourth table leaves.

* * * * *